United States Patent
Kamei

(10) Patent No.: US 7,660,522 B2
(45) Date of Patent: Feb. 9, 2010

(54) CAMERA WITH DISPLAY PANEL

(75) Inventor: Takatoshi Kamei, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/332,873

(22) Filed: Dec. 11, 2008

(65) Prior Publication Data

US 2009/0096911 A1 Apr. 16, 2009

Related U.S. Application Data

(63) Continuation of application No. 11/281,414, filed on Nov. 18, 2005.

(30) Foreign Application Priority Data

Dec. 28, 2004 (JP) .............................. 2004-381562

(51) Int. Cl.
*G03B 17/24* (2006.01)
*G03B 13/02* (2006.01)
(52) U.S. Cl. .................. 396/312; 396/374; 396/542
(58) Field of Classification Search ................ 396/312, 396/374, 283, 535, 542; 348/333.01
See application file for complete search history.

(56) References Cited

U.S. PATENT DOCUMENTS

| | | | |
|---|---|---|---|
| RE30,099 E | 9/1979 | Hosoe et al. | |
| 5,742,341 A | 4/1998 | Ohishi et al. | |
| 7,336,782 B2 * | 2/2008 | Watanabe et al. | 379/433.13 |
| 2001/0004269 A1 * | 6/2001 | Shibata et al. | 348/333.06 |
| 2003/0013417 A1 * | 1/2003 | Bum | 455/90 |
| 2004/0004667 A1 | 1/2004 | Morikawa et al. | |
| 2007/0082693 A1 | 4/2007 | Drucker et al. | |
| 2008/0102888 A1 | 5/2008 | Sellgren et al. | |

FOREIGN PATENT DOCUMENTS

| | | | |
|---|---|---|---|
| JP | 1-156667 U | | 10/1989 |
| JP | 11-252415 | | 9/1999 |
| JP | 2000-152048 | | 5/2000 |
| JP | 2000-165719 | * | 6/2000 |
| JP | 2000-295505 | | 10/2000 |
| JP | 2001-024914 | | 1/2001 |
| JP | 2002-247432 | | 8/2002 |
| JP | 2004-007553 | | 1/2004 |

OTHER PUBLICATIONS

Japanese Office Action dated Feb. 10, 2009, for Appln. No. 2008-311927.

* cited by examiner

*Primary Examiner*—Christopher Mahoney
(74) *Attorney, Agent, or Firm*—Pillsbury Winthrop Shaw Pittman, LLP

(57) ABSTRACT

A camera with a display panel comprises a camera body and an LCD panel unit. The LCD panel unit is swingably attached to the camera body by a hinge portion. The LCD panel unit is provided with the display panel. A speaker portion is located on one surface (on the same side as an image display screen) of the LCD panel unit. A microphone portion is located on the other surface of the LCD panel unit, that is, a surface opposite from the image display screen. The LCD panel unit houses a circuit board including sound circuits. The circuit board is connected electrically with a speaker and a microphone through a connector portion.

4 Claims, 4 Drawing Sheets

CAMERA WITH DISPLAY PANEL

CROSS-REFERENCE TO RELATED APPLICATIONS

This application is a continuation of co-pending U.S. application Ser. No. 11/281,414, filed Nov. 18, 2005, and for which priority is claimed under 35 U.S.C. §120. This application is based upon and claims the benefit of priority under 35 U.S.C. § 119 from the prior Japanese Patent Application No. 2004-381562, filed Dec. 28, 2004, the entire contents of both applications are incorporated herein by reference in their entireties.

BACKGROUND

1. Field

The present invention relates to a camera with a display panel for converting a subject image into digital data and recording the data into a recording medium.

2. Description of the Related Art

In a camera such as a digital video camera, which converts an image of a subject into digital data and records it into a recording medium, an LCD panel unit having a built-in liquid crystal display panel sometimes may be used to monitor the subject image. Usually, the LCD panel unit is swingably attached to a camera body by a hinge. The panel unit is opened when the subject is shot. It is closed when shooting is not required.

Some cameras of this type may be provided with a microphone portion for recording a sound and a speaker portion for reproducing the recorded sound. In general, a speaker portion is attached to a camera body, as described in Jpn. Pat. Appln. KOKAI Publication No. 2000-152048. In a portable terminal described in Jpn. Pat. Appln. KOKAI Publication No. 2004-7553, moreover, a speaker portion and a microphone portion are located on an LCD panel unit and a terminal body, respectively.

If the speaker portion is located on the camera body, in each of the digital video cameras having the swingable LCD panel unit described above, the speaker portion and an image display screen of the liquid crystal display panel are not flush with each other. Therefore, a sound is always emitted in a fixed direction from a speaker without regard to the orientation of the panel unit.

On the other hand, a sound circuit is inevitably divided in two in the camera of which the camera body and the LCD panel unit are provided with the speaker portion and the microphone portion, respectively, or the microphone portion and the speaker portion, respectively. More specifically, a part of the sound circuit is located in the camera body, while the remaining part is housed in the LCD panel unit. Thus, the sound circuit must be partially situated in the camera body that is severely restricted in space.

BRIEF DESCRIPTION OF THE DRAWING

The accompanying drawings, which are incorporated in and constitute a part of the specification, illustrate embodiments of the invention, and together with the detailed description of the embodiments given below, serve to explain the principles of the invention.

DETAILED DESCRIPTION OF THE INVENTION

A camera according to an embodiment of the invention will now be described with reference to FIGS. 1 to 4.

Figure 1:
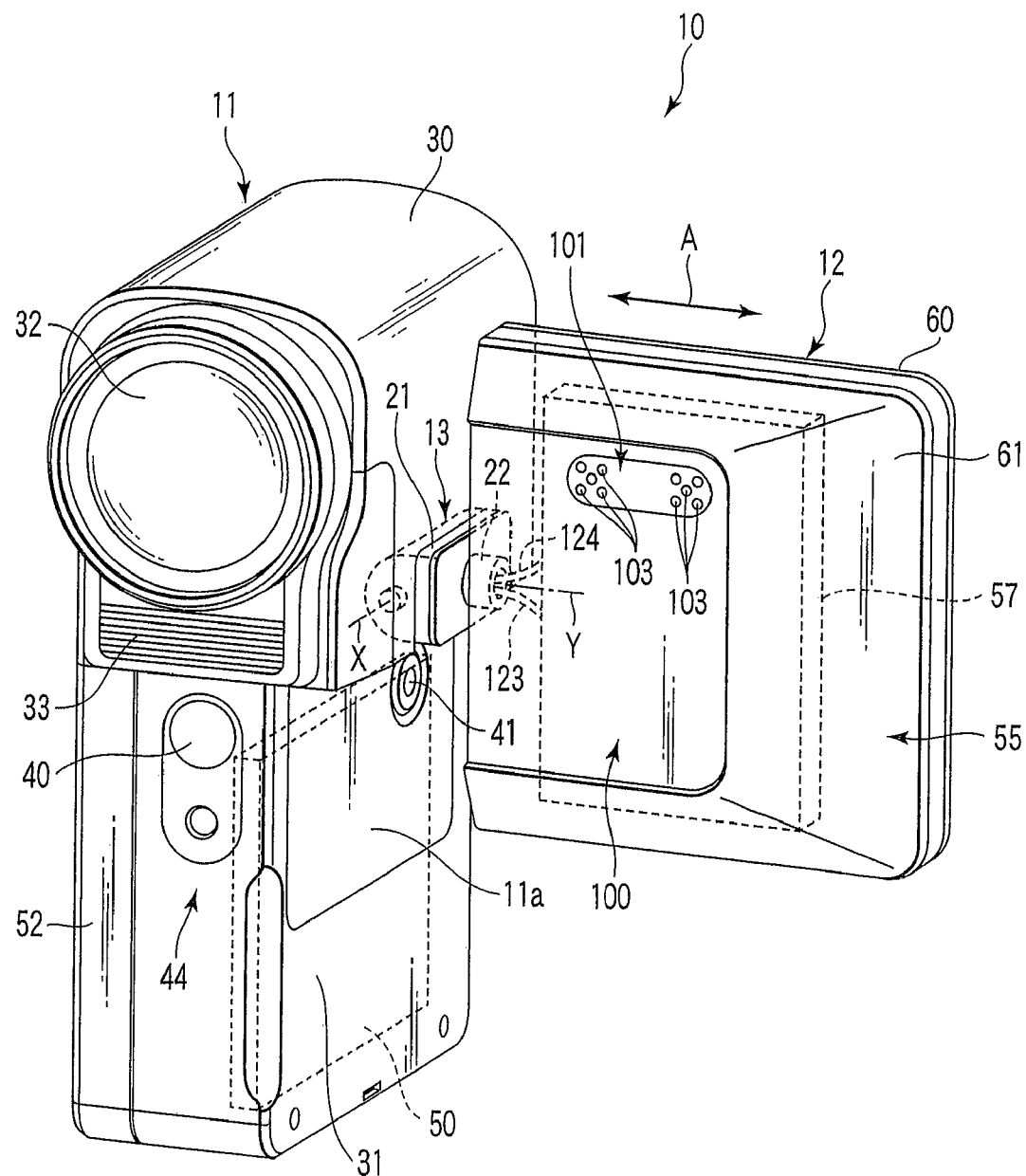
FIG. 1 is a perspective view of a camera according to an embodiment of the invention with its LCD panel unit open.

FIG. 1 shows a digital video camera 10 as an example of a camera.

Figure 2:
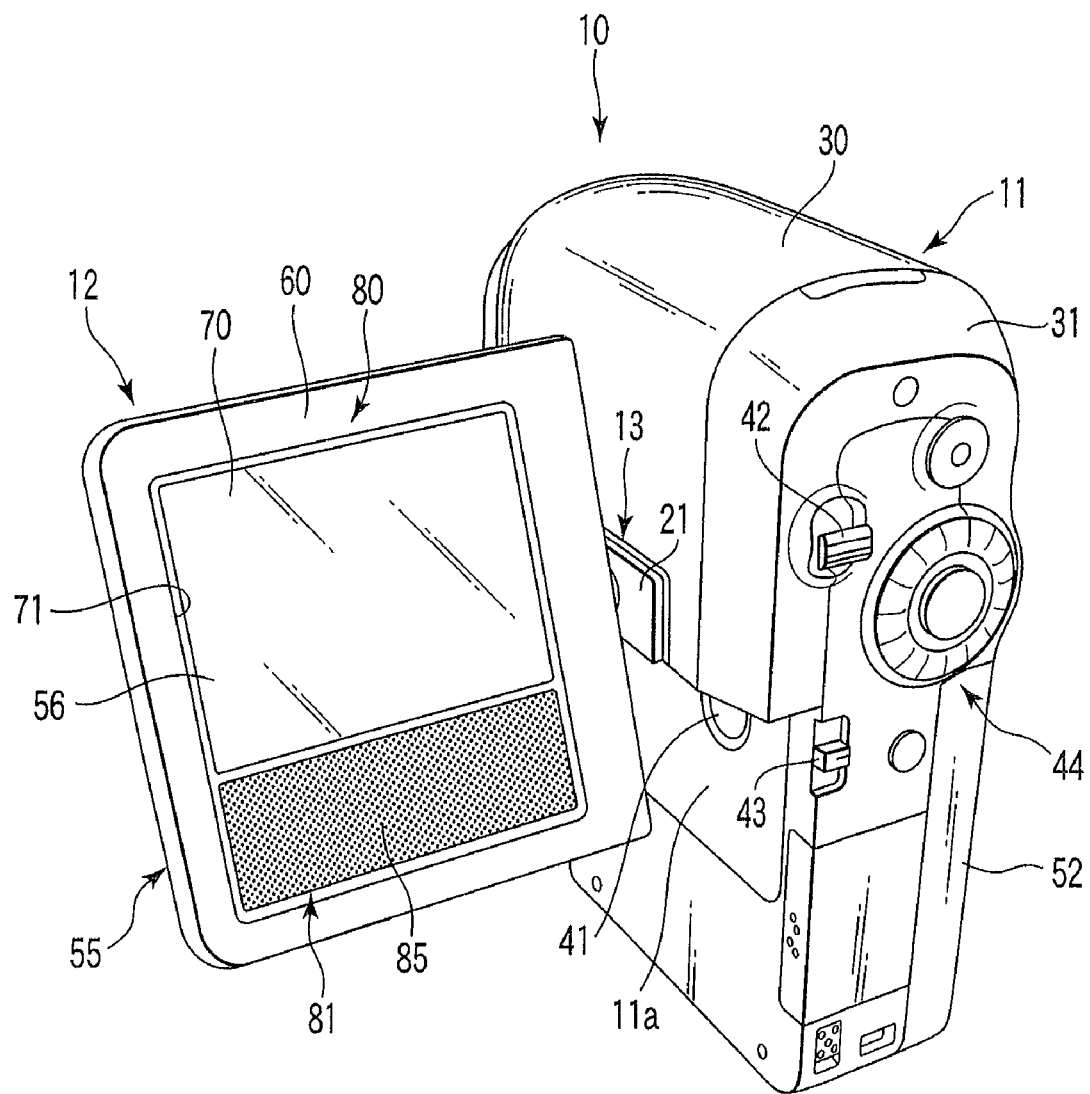
FIG. 2 is a perspective view of the camera of FIG. 1 taken from the side of an image display screen.
Figure 3:
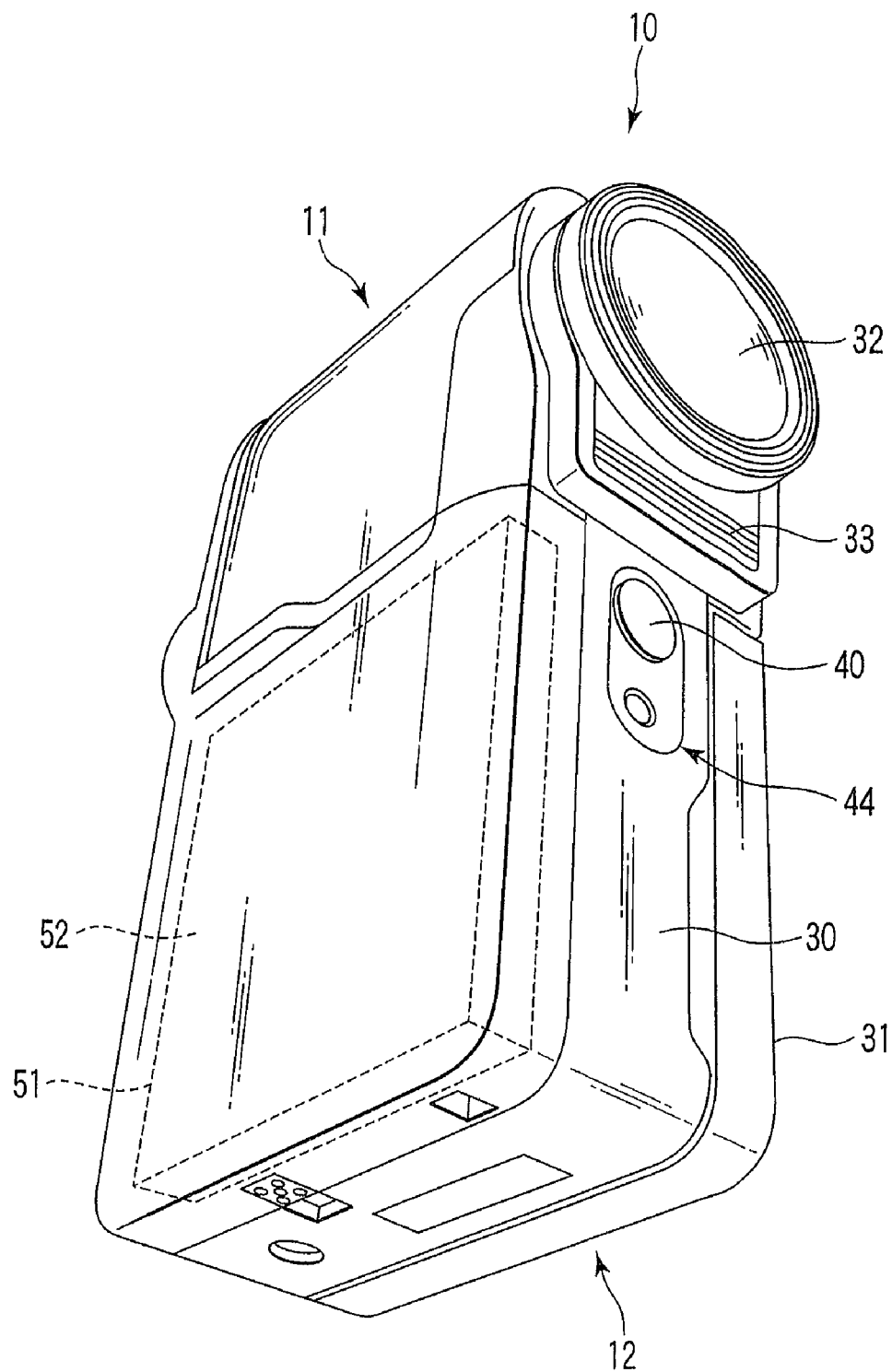
FIG. 3 is a perspective view of the camera of FIG. 1 with its LCD panel unit closed.
Figure 4:
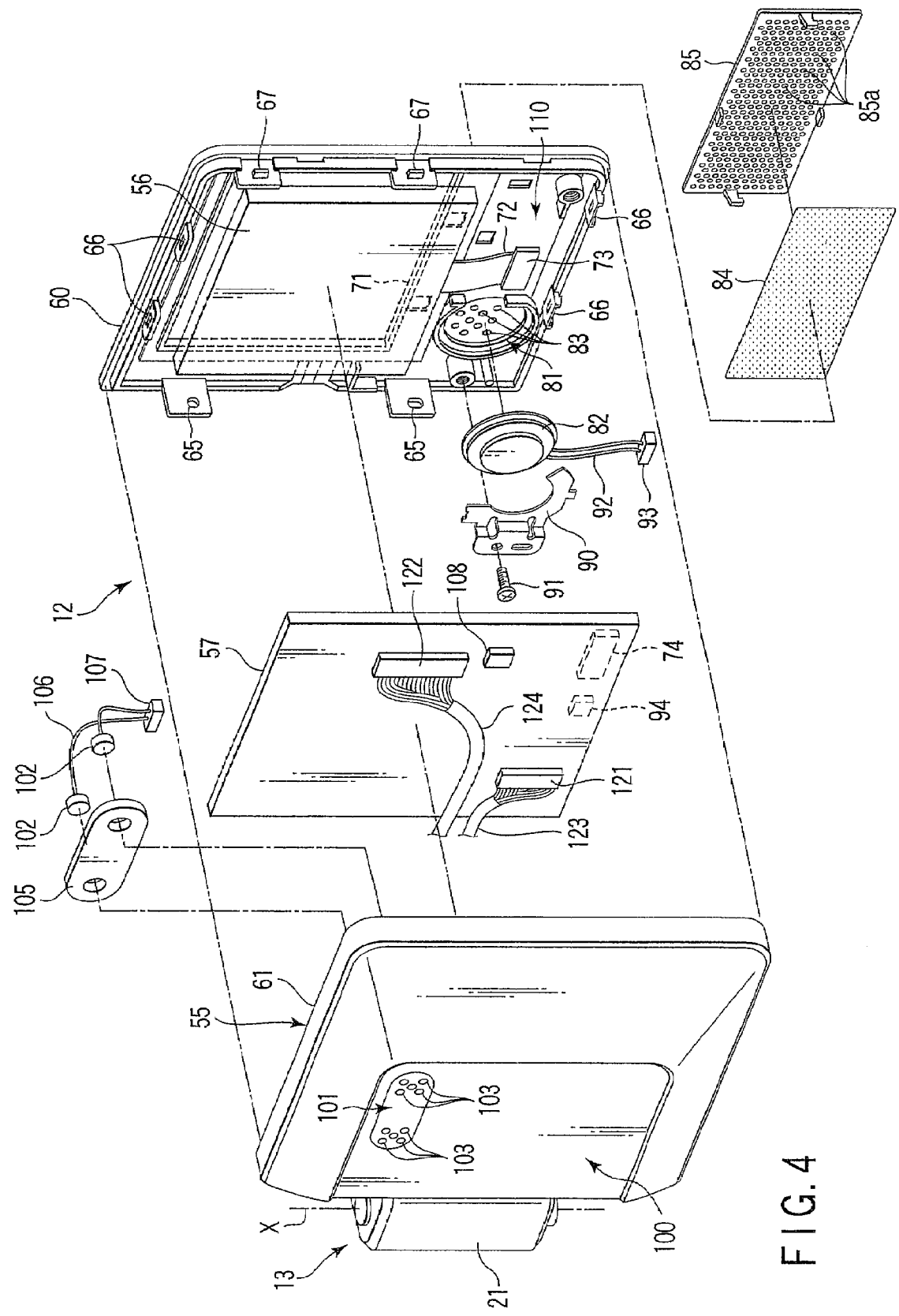
FIG. 4 is an exploded perspective view of the LCD panel unit of the camera of FIG. 1.

The camera 10 comprises a camera body 11 and an LCD panel unit 12. The panel unit 12 is swingably attached to the camera body 11 by a hinge portion 13. FIGS. 1 and 2 show the LCD panel unit 12 in its open state, and FIG. 3 shows the panel unit 12 in its closed state.

As shown in FIG. 1, the hinge portion 13 has a first hinge member 21 on the side of the camera body 11 and a second hinge member 22 on the side of the LCD panel unit 12. The first hinge member 21 is supported on the camera body 11 so as to be rotatable around a first axis X. The first axis X extends in the longitudinal direction (along the optical axis of a shooting lens 32) along a side face 11a of the camera body 11.

The second hinge member 22 is rotatable around a second axis Y that extends at right angles to the first axis X. The second axis Y extends in the transverse direction (indicated by arrow A in FIG. 1) of the LCD panel unit 12. The first and second hinge members 21 and 22 are connected to each other for rotation around the second axis Y and constitute the hinge portion 13 of the so-called biaxial type. The second hinge member 22 is in the form of a hollow cylinder.

The camera body 11 has a housing 30 of, for example, synthetic resin. A grip portion 31 is formed at the lower part of the housing 30. It has a shape such that it can be grasped by one hand of a user. The shooting lens 32, an electronic flash 33, etc. are arranged on the upper part of the camera body 11. Further, the camera body 11 is provided with a control section 44 including various buttons and switches, such as a shutter button 40, power switch 41, zoom lever 42 (FIG. 2), and mode lever 43.

The camera body 11 contains a control circuit board 50 (FIG. 1), a battery 51 (FIG. 3) for use as a power source, a recording medium (not shown), etc. The battery 51 is covered by a battery cover 52. Although a hard disc drive (HDD) is used as an example of the recording medium, it may be replaced with a magnetic tape or a card- or stick-shaped recording medium. The control circuit board 50 is mounted with electronic components, such as a system board that electrically controls the camera 10.

The LCD panel unit 12 has a unit housing 55 in the form of a flat box, a liquid crystal display panel 56 as an example of a display panel, and a circuit board 57 (FIG. 4) that includes sound circuits. The unit housing 55 is composed of an LCD mask 60 as a display mask of synthetic resin for holding the liquid crystal display panel 56 and an LCD cover 61 as a display cover of synthetic resin that is bonded to the LCD mask 60.

Retaining portions 65, 66 and 67 are formed on the LCD mask 60. In assembling the unit housing 55, the LCD mask 60 and the LCD cover 61 are fixed to each other with fixing elements, such as screw members (not shown), in a manner such that the retaining portions 65, 66 and 67 are anchored to receiving portions (not shown) of the LCD cover 61.

An image display screen 70 (FIG. 2) of the liquid crystal display panel 56 is located inside a rectangular frame portion 71 that is formed on the LCD mask 60. A backlight (not shown) is located at the back of the liquid crystal display panel 56. A connector 73 is provided on an end portion of a flexible wiring board 72 (FIG. 4) that is attached to the liquid crystal display panel 56. The connector 73 is connected to a connector portion 74 for LCD that is mounted on the circuit board 57.

A speaker portion 81 is located on one surface of the LCD panel unit 12, that is, a surface 80 on the same side as the image display screen 70 of the liquid crystal display panel 56. The speaker portion 81 includes a speaker 82, sound holes 83, sound-permeable sheet 84 of unwoven fabric cloth, speaker cover member 85, etc. The speaker 82 converts electrical signals into vibrations of air. A sound emitted from the speaker 82 is discharged from the unit housing 55 through the sound holes 83. The sound-permeable sheet 84 conceals the sound holes 83 from the outside of the unit housing 55. The speaker cover member 85 is located on the outer surface side of the sheet 84. The sound holes 83 are formed in the LCD mask 60.

A large number of sound output holes 85a are formed in the speaker cover member 85. They serve to allow the sound to be outputted without interception. The surface of the cover member 85 and the image display screen 70 of the liquid crystal display panel 56 are arranged substantially flush with each other inside the frame portion 71 that is formed on the one surface 80 of the LCD panel unit 12. Thus, when the panel unit 12 is opened, as shown in FIG. 2, the image display screen 70 and the surface of the speaker cover member 85 are vertically arranged on the same plane.

The speaker 82 is fixed to the reverse side of the LCD mask 60 by a speaker holder 90. More specifically, it is sandwiched between the LCD mask 60 and the holder 90 when it is fixed to the LCD mask 60 with a screw member 91. A connector 93 is provided on an end portion of a harness member 92 that is connected to the speaker 82. The connector 93 is connected to a speaker connector portion 94 that is mounted on the circuit board 57.

A microphone portion 101 is located on the other surface of the LCD panel unit 12, that is, a surface 100 opposite from the image display screen 70 of the liquid crystal display panel 56. The microphone portion 101 includes microphones 102, which converts vibrations of air into electrical signals, and sound holes 103. The sound holes 103 are formed in the LCD cover 61.

The microphones 102 are attached to the reverse side of the LCD cover 61 by a microphone holder 105 of an elastic material, such as robber, as a cushion member. A connector 107 is provided on an end portion of a harness member 106 that is connected to the microphones 102. The connector 107 is connected to a microphone connector portion 108 that is mounted on the circuit board 57.

A space portion 110 (FIG. 4) is defined in the unit housing 55 of the LCD panel unit 12. It contains electronic components, such as the circuit board 57, speaker 82, microphones 102, etc. The circuit board 57 that is housed in the space portion 110 includes an LCD circuit and the sound circuits. The speaker 82 is connected electrically to the sound circuits of the circuit board 57 through the harness member 92 and the connector portion 94. Further, the microphones 102 are connected electrically to the same sound circuits through the harness member 106 and the connector portion 108.

The circuit board 57 is provided with a first connector 121 and a second connector 122. A harness member 123 for the sound circuits is connected to the first connector 121. An LCD harness member 124 is connected to the second connector 122. The harness members 123 and 124 serve to connect the control circuit board 50 in the camera body 11 and the circuit board 57 in the LCD panel unit 12 electrically to each other. They penetrate the hinge portion 13 or the first and second hinge members 21 and 22 and extend between the camera body 11 and the panel unit 12.

The following is a description of the operation of the camera 10 according to the present embodiment.

The LCD panel unit 12 of the camera 10 is swingable with respect to the camera body 11 between an open position shown in FIGS. 1 and 2 and a closed position shown in FIG. 3. When the panel unit 12 is closed, the image display screen 70 of the liquid crystal display panel 56 overlaps the side face 11a of the camera body 11. The user opens the panel unit 12 when he/she shoots a subject image while monitoring it through the liquid crystal display panel 56.

When the LCD panel unit 12 is opened, as shown in FIG. 1, the microphone portion 101 faces on the same side (subject side) as the shooting lens 32. As the subject is shot through the shooting lens 32, therefore, the user can direct the microphone portion 101 toward the subject. Further, the user can direct the image display screen 70 of the liquid crystal display panel 56 on the same side as the shooting lens 32 by reversing the LCD panel unit 12 at 180 degrees around the second hinge member 22.

If the power switch 41 is turned on when the LCD panel unit 12 is in the open position, the subject can be shot through the shooting lens 32 as the control section 44 is operated. While the subject is being shot, moreover, the microphones 102 can be used to record the sound. The image of the subject being shot can be monitored, since it is displayed on the image display screen 70 of the liquid crystal display panel 56.

The recorded subject image and sound are recorded in the recording medium in the camera body 11. The recorded image can be reproduced as required and displayed on the image display screen 70 of the liquid crystal display panel 56. The recorded sound can be also reproduced and emitted from the speaker portion 81.

When the LCD panel unit 12 is in the open position, as shown in FIG. 2, the image display screen 70 of the liquid crystal display panel 56 and the speaker portion 81 range vertically, so that a sideways projection of the panel unit 12 can be compact.

In the camera 10 according to the present embodiment, the image display screen 70 of the liquid crystal display panel 56 and the speaker portion 81 are arranged side by side on the one surface 80 of the LCD panel unit 12. When the image and the sound are reproduced, therefore, the sound is outputted from the same side as the image that is projected on the display screen 70. Thus, an optimum sound never fails to be reproduced without regard to the orientation of the panel unit 12.

When the LCD panel unit 12 is closed, it overlaps the side face 11a of the camera body 11 with the microphone portion 101 exposed to the outside. When the LCD panel unit 12 is thus located in the closed position, a built-in sensor (not shown) in the camera body 11 detects that the panel unit 12 is closed, whereupon the liquid crystal display panel 56 is switched off.

Even when the LCD panel unit 12 is in the closed position, the subject can be shot through the shooting lens 32 by using a remote control function. Also in this closed position, moreover, the microphone portion 101 can be used effectively, since it is exposed to the outside of the panel unit 12.

In the camera 10 according to the present embodiment, the space portion 110 in the LCD panel unit 12, which has a greater spatial margin than the camera body 11, houses electronic components, such as the speaker 82, microphones 102, circuit board 57 including the sound circuits, harness members 92 and 106 used for the sound circuits, etc. Thus, the panel unit 12 collectively houses the components associated with the sound circuits.

The control circuit board 50 in the camera body 11 and the circuit board 57 in the LCD panel unit 12 are connected electrically to each other by the harness members 123 and 124, and no components for the sound circuits are provided in the camera body 11. Thus, fewer components need be housed in the camera body 11, so that it can be miniaturized correspondingly.

According to the configuration described above, the sound never fails to be outputted from the same plane as the image display screen 70 of the liquid crystal display panel 56 without regard to the direction in which the panel unit 12 faces, an optimum sound can be reproduced independently of the orientation of the panel unit 12. Since the speaker portion 81 and the microphone portion 101 are arranged on the LCD panel unit 12, moreover, the sound circuits can be housed collectively in the panel unit 12. In this case, the number of components to be housed in the camera body 11 is reduced, so that the camera body 11 can be reduced in size.

It is to be understood that the present invention is applicable to digital video cameras that can shoot both animated and still pictures. Alternatively, however, the invention may be applied to both digital video cameras that can shoot only animated pictures and ones that can shoot only still pictures. In short, the invention is applicable to any of cameras that have a speaker, microphone, and swingable LCD panel unit, and can convert a subject image into digital data and record it into a recording medium.

The display panel described above may be an organic EL(Electroluminescence) panel, an inorganic EL, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera with a display panel, comprising:
a camera body having a shooting lens and a control section, and containing a control circuit board;
a panel unit swingably attached to the camera body by a hinge portion, and having an image display screen of the display panel, a speaker portion which includes a speaker and a microphone portion which includes a microphone; and
a sound circuit board which includes a sound circuit which is provided in the panel unit and electrically connected to the speaker portion and the microphone portion,
wherein the speaker of the speaker portion is provided on one surface of the sound circuit board, and the speaker is connected to a connecter portion for the speaker which is provided on one surface of the sound circuit board, and
wherein the microphone of the microphone portion is provided on the other surface of the sound circuit board, and the microphone is connected to a connecter portion for the microphone which is provided on the other surface of the sound circuit board.

2. The camera with a display panel according to claim 1, further comprising an electric wire member which electrically connects the control circuit board in the camera body and the sound circuit in the panel unit, the electric wire member penetrating the hinge portion.

3. The camera with a display panel according to claim 2, wherein the hinge member has a first hinge member which is provided on the camera body and configured to rotate around a first axis extending along a side face of the camera body and a second hinge member which is mounted on the panel unit and configured to rotate around a second axis extending at right angles to the first axis.

4. The camera with a display panel according to claim 3, wherein the second hinge member is formed of a cylindrical material, and the electric wire member which electrically connects the control circuit board in the camera body and the sound circuit in the panel unit is provided to extend through the second hinge member.

* * * * *